May 19, 1936.  G. GASH ET AL  2,041,538

HORSESHOE

Filed June 1, 1933  2 Sheets-Sheet 1

Gordon Gash
Charles Michael Godby
by Wright, Brown, Quinby & May
Attorneys

May 19, 1936.                G. GASH ET AL                2,041,538
                                HORSESHOE
                            Filed June 1, 1933          2 Sheets-Sheet 2
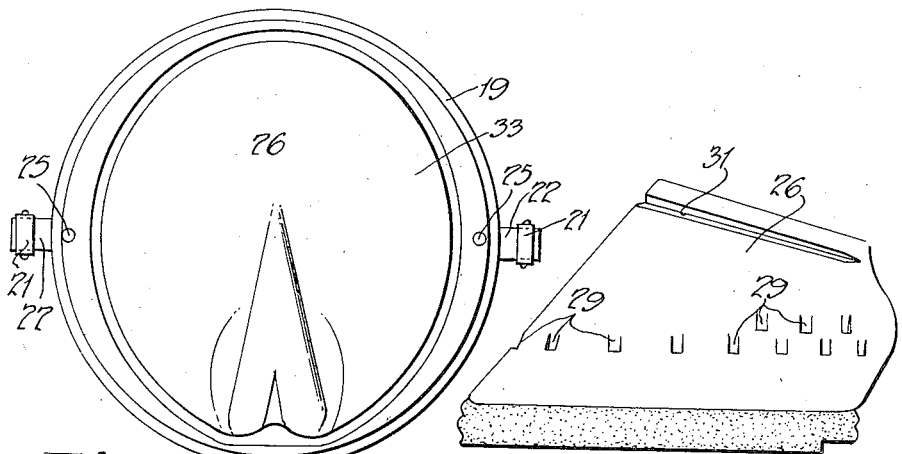
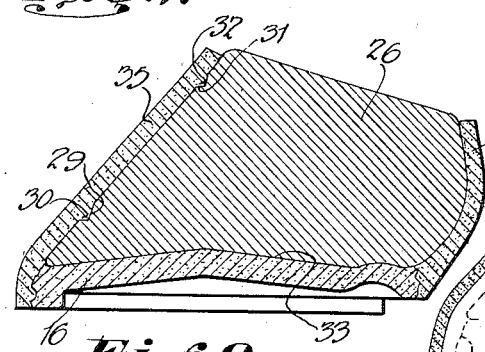
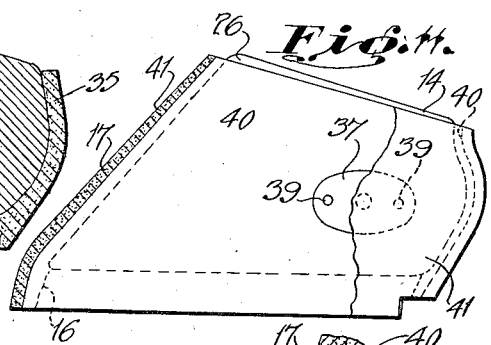
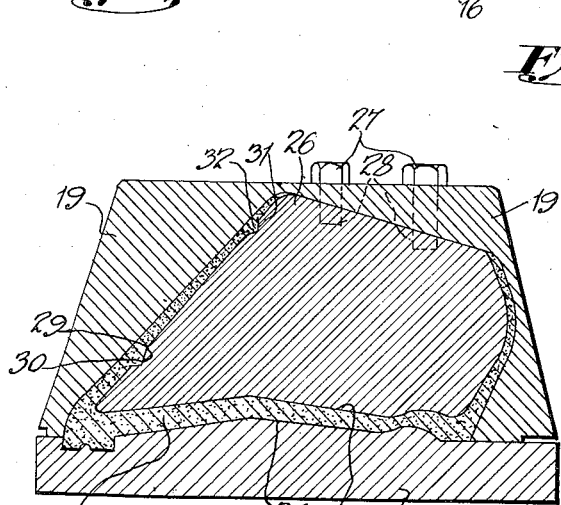
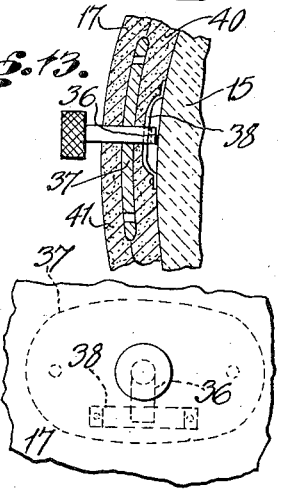

Patented May 19, 1936

2,041,538

UNITED STATES PATENT OFFICE 2,041,538

HORSESHOE

Gordon Gash, Balaclava, and Charles Michael Godby, Caulfield, Victoria, Australia Application June 1, 1933, Serial No. 673,860
In Australia June 8, 1932

1 Claim. (Cl. 168—4)

The object of this invention is to provide a resilient horse shoe including a tread shaped to cover the entire bottom of a horse's hoof and an elastic wall tapered to conform to the taper of a horse's hoof and adapted to spring into contact therewith, said wall being provided on its inner surface with inwardly projecting protuberances formed integral therewith, arranged to be pressed against the hoof by the contractile force of said wall, and so engage the external surface of the hoof as to yieldingly oppose removal of the shoe therefrom, the opposition to such removal, affected conjointly by the contractile force of the wall and said protuberances, being sufficient to prevent accidental removal of the shoe. Said protuberances may be wedge-shaped, and the shoe may be formed by a mould and a core cooperating therewith.

A shoe according to the present invention may comprise a solid hardened base or tread portion.

The shoe is moulded of resilient material preferably rubber in such manner that on application of the shoe to the hoof of a horse the said shoe may be sprung into position around said hoof and retained thereon.

Another important feature embodied in our invention is the means for maintaining the shoe in a desired position on the horse's hoof, said means preferably comprising a plurality of wedge like projections or protuberances formed integral with and on the inside wall of the shoe, said projections being of a preferably resilient nature and preferably downwardly inclined.

Other features are described hereinafter with reference to the accompanying drawings in which—

Figure 7 is a plan view of the mould with the cover removed and the core in position therein.

Figure 8 is an elevation of the metal core with the plastic compound base mounted thereon.

Figure 9 is a section elevation of the metal core with the plastic compound base and plastic compound wall sections mounted thereon.

Figure 10 is a sectional elevation of the assembled mould carrying the plastic compound shoe ready for vulcanizing.

Figure 11 is an elevation of a metal core showing a modification of embodying a metal plate between two sections of plastic compound, one of which is partly cut away.

Figure 12 is a fragmentary detail elevation of the modified form of fastening means.

Figure 13 is a sectional elevation of Figure 12.

Figure 1:
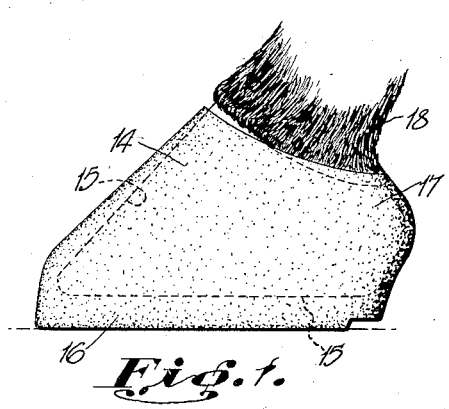
Figure 1 is an elevation of a horse's hoof having the resilient shoe mounted thereon.
Figure 2:
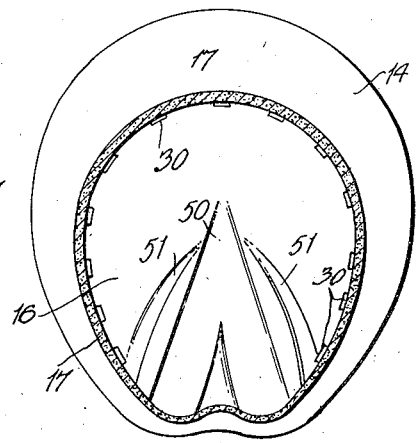
Figure 2 is a plan view of the resilient shoe with portion of the wall cut away.
Figure 3:
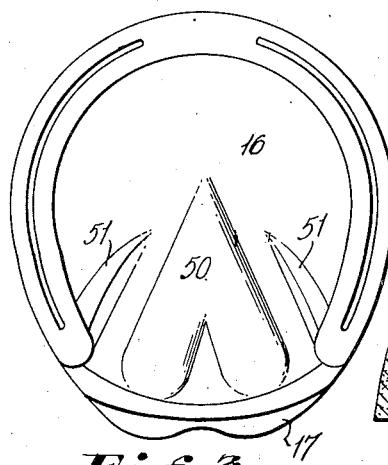
Figure 3 is an underside plan view of the resilient shoe.

According to one form of carrying our invention into practical effect the improved horse shoe 14 which is preferably composed of a resilient material such as rubber is either moulded or shaped so that on being attached to the hoof 15 of the horse by any suitable means the resilient material conforms to the external contour of the hoof 15 and is retained in position thereon without fastening means formed separately from the shoe.

The base 16 of the shoe 14 is composed of a preferably resilient material having a hardened or toughened surface so as to resist wear while the wall 17 of the shoe 14 is of a resilient material preferably rubber and extends upwardly to conform to the shape of a hoof 15 of a horse when the shoe 14 is in the attached position thereon, the upper end of the shoe 14 terminating below the fetlock 18 of the horse.

The wall 17 of the shoe 14 is inclined and substantially conforms to the shape of the hoof 15, the interior of the wall 17 closely embracing the exterior surface of the hoof 15 which is thereby substantially covered by the shoe 14.

In one means of forming the resilient shoe 14 as previously described a preferably aluminium mould 19 is employed having a detachable cover 20 which may be held in position on the mould 19 by suitable means preferably by U-shaped clips 21 pivotally mounted to projecting lugs 22 formed on the mould 19, the said clips 21 being adapted to engage with corresponding lugs 23 formed on the cover 20 of the mould 19 to maintain said cover 20 in a determined position upon the mould 19 during operation, dowel pins 24 being disposed on the cover 20 and adapted to register with corresponding openings 25 in the upper edge of the mould 19 to determine the correct position of the cover 20 in relation to the mould 19.

Incorporated within the mould 19 is a detachable core 26 of a shape corresponding to a horse's hoof 15, the interior of the mould 19 corresponding in shape to the exterior of the core 26 but of a larger dimension to permit the entry of the core 26 having the plastic compound sections from which the shoe 14 is comprised mounted thereon.

Suitable means are provided for maintaining the core 26 in a set position within the mould 19; said means preferably comprising set screws 27 adapted to pass through openings in the bottom of the mould 19 and engage with tapped holes 28 in the adjacent face of the core 26.

Disposed around the inclined face of the core 26 is a plurality of indentations 29 of desired formation preferably wedge shaped in order to provide the interior of the wall 17 of the finished shoe 14 with projections 30 to form gripping means for maintaining the shoe 14 in position on the horse's hoof 15. Near one end of the core 26 is also disposed a circumferential groove 31 preferably V-shaped to provide the upper part of the wall 17 of the shoe 14 with an internal V-shaped ridge 32 for gripping purposes.

The top 33 of the core 26 is shaped to preferably correspond with the underside of the horse's hoof 15 whereas the inside surface 34 of the cover 20 is shaped to impart to the normal bottom of the plastic compound from which the shoe is comprised, a configuration corresponding to the underside of the horse's hoof 15 with or without the usual metal horse-shoe or other design attached thereto.

In one manner of forming the resilient shoe 14 the base section 16 is firstly formed from a plastic rubber compound of required thickness, the section 16 being cut to the approximate shape of the normal top 33 of the core 26 and placed in the preferably aluminium mould 19 between the top 33 of the detachable metal core 26 positioned therein and the detachable cover 20 of the mould 19, a required pressure is then applied to the cover 20 of the mould 19 resulting in the plastic rubber compound base section 16 being given a desired formation as the top 33 of the core 26 is shaped to preferably correspond with the underside of the horse's hoof 15 and the inside surface 34 of the cover 20 shaped to impart to the normal bottom of the plastic compound section 16 a configuration corresponding to the underside of the horse's hoof 15.

After the operation of forming the base 16 has passed through the first step above described the cover 20 of the mould 19 is removed and the detachable core 26 removed from the mould 19, the plastic compound base 16 remaining in contact with the core 26 as illustrated in Figure 8. One or more suitable sections 35 (Figure 9) of plastic compound is or are then applied around the inclined surface of the core 26 which corresponds to the shape of the horse's hoof 15, the lower portion of the sections 35 being made to contact with the plastic base section 16 as illustrated in Figure 9 after which the core 26 is replaced in the mould 19 and made a fixture therein by the set screws 27 disposed in the bottom of the mould 19.

The cover 20 of the mould 19 is then placed in position so that the dowel pins 24 incorporated therein register with their respective openings in the mould 19 and a pressure applied to the cover 20 to enable the U-shaped clips 21 to be engaged with the lugs 23 provided on the cover 20 after which the applied pressure is released and the mould 19 placed in a suitable vulcanizer where it is allowed to remain a desired period in order to carry out the operation of vulcanizing the shoe 14 after which time the shoe 14 is removed from the core 26 of the mould 19.

The interior surface of the mould 19 has preferably a smooth finish in order to provide the finished shoe with a polished like exterior surface.

In one modification of the invention as illustrated in Figures 11, 12 and 13 the fastening means may comprise right angled clips 36 rotatably mounted in reinforcing plates 37 embedded in the wall 17 of the shoe 14, one on either side of the shoe 14, said clips 36 being inserted through the plate 37 from the interior of the shoe 14 and adapted to be operated from the exterior of the shoe 14, suitable means being provided on the hoof 15 of the horse to receive the inner end of the clips 36, said means preferably comprising bars or strips 38 of metal mounted to the hoof 15 and with which the clips 36 may be easily made to engage to ensure the shoe 14 being firmly held to the hoof 15 of the horse.

In one means of forming the resilient shoe 14 to incorporate the above mentioned reinforcing plates 37 the core 26 has mounted thereon in a desired manner and in desired position projecting pins 39 over which a section 40 of plastic compound is placed when building up the wall 17 of the shoe 14 as previously described a reinforcing plate 37 of desired formation is then positioned on the projecting pins 39 and a further similar section 41 of plastic compound applied to the first positioned section 40 resulting in the reinforcing plate 37 being disposed between the two sections 40 and 41 of plastic compound as illustrated in Figures 11 and 13, the lower portion of said sections 40 and 41 being made to contact with the plastic compound base 16 and the operation of forming the shoe 14 carried out in a similar manner to that previously described.

Obviously no nails are necessary with the shoe 14 which is retained in position on the horse's hoof 15 by either of the fastening means above described.

The resilient material of which the shoe is composed may comprise rubber, a composition including rubber or rubber incorporating fabric or the like and if desired the interior of the shoe may have an integral material lining. The shoe shown by Figures 1, 2, 3 and 4 is designated as a whole by 14 and comprises the tread 16 shaped to cover the entire bottom of the hoof and having the upper surface shaped to conform to the frog bottom of the hoof, and a resilient wall 17 shaped to conform to the external surface of a hoof 15, below the fetlock 18 and adapted to be expanded to permit its application to the hoof and to spring or contract into contact therewith.

Figure 4:
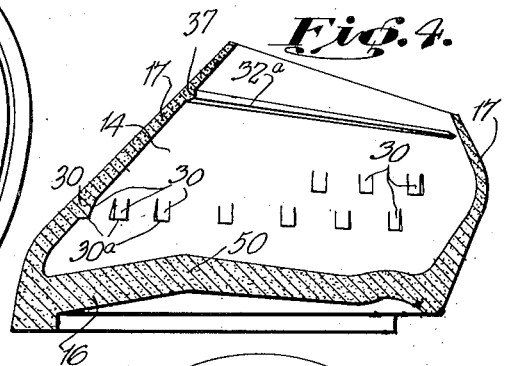
Figure 4 is a sectional elevation of the resilient shoe.
Figure 5:
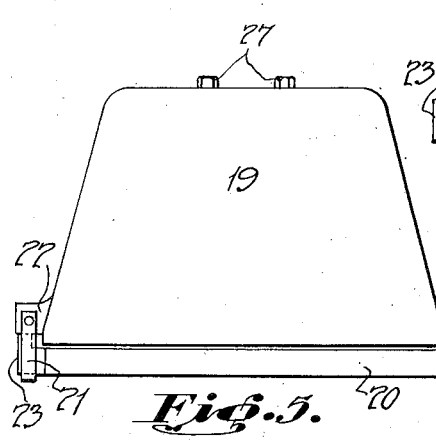
Figure 5 is an elevation of the assembled mould.
Figure 6:
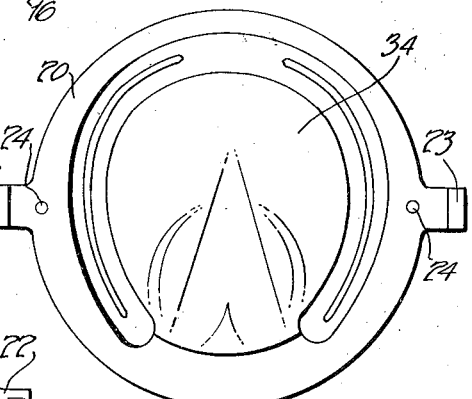
Figure 6 is a plan view of the inside surface of the cover.

The wall 17 is provided on its inner surface with integral inwardly projecting compressible protuberances formed and arranged to be pressed against the hoof by the contractile force of the wall, and compressed against the hoof thereby to frictionally engage the external surface of the hoof and yieldingly oppose removal of the shoe, such removal being also yieldingly opposed by the contractile force of the wall. Said protuberances may include a plurality of spaced apart compressible lugs 30 integral with the wall 17, each lug having two faces meeting to form a compressible salient angle 30ᵃ. As shown by Figure 4 there may be a plurality of spaced apart rows of lugs 30. The protuberances may also include elongated ridges 37, one of which is shown by Figure 4. Said ridges extend substantially parallel with the tread 16 and are spaced therefrom. Each ridge preferably has two inclined faces meeting to form a compressible elongated salient angle 37ª. The spaced protuberances on the tread 16, adapted to conform to the frog of the hoof, are designated by 50, and 51, in Figures 2, 3 and 4. The inwardly projecting lugs or protuberances 30 and 37 are compressible and deformable by the contraction of the resilient wall portion 17 of the shoe on the tapered portion of the hoof 15, so that when the shoe is donned or operatively applied to the hoof said protuberances are compressed and deformed or flattened against the hoof, and provide the internal surface of the wall portion 17 with compressed areas in more pronounced, or stronger clinging contact with the hoof than are the remaining and major internal surface portions of the wall 17. The salient angles 30ª and 37ª formed by the meeting faces of said lugs or protuberances yield and practically disappear when they are forced by the contraction of the wall portion of the shoe on the tapered portion of the hoof, the result being a stronger clinging pressure of the material of said lugs or protuberances on the portions of the hoof on which they bear than the pressure of the major portions of the internal surface of the wall portion on the hoof, so that while the shoe may be easily donned and doffed, accidental displacement of the shoe is prevented.

We do not wish to be arbitrarily confined to the hereinbefore mentioned details since we may if necessary have to depart therefrom and while we have described the essential characteristics of our invention we desire it to be understood that various improvements and modifications may be embodied in the invention without departing from its spirit and scope.

What we claim as our invention and desire to secure by Letters Patent is:

A resilient horse shoe comprising a tread portion and a wall portion shaped to conform to the tapered portion of the hoof above its tread portion, and adapted to spring into contact with said tapered portion, said wall portion being provided on its inner surface with inwardly projecting compressible and deformable protuberances formed and arranged to be pressed against the hoof by the contractile force of said wall portion, and compressed and deformed or flattened against the hoof to provide the internal surface of the wall portion with compressed areas adapted to cling to the hoof more strongly than the major portions of said internal surface, said major portions surrounding the protuberances, said protuberances including elongated ridges extending substantially parallel with the tread portion of the shoe and spaced therefrom, each ridge having two faces meeting to form a compressible and deformable salient angle extending lengthwise of the ridge, the arrangement being such that the shoe may be freely donned and doffed, and is confined against accidental displacement by said compressed areas.

GORDON GASH.
CHARLES MICHAEL GODBY.